(12) United States Patent
Hom et al.

(10) Patent No.: US 7,516,134 B2
(45) Date of Patent: Apr. 7, 2009

(54) CONTROLLING ACCESS TO A DATABASE USING DATABASE INTERNAL AND EXTERNAL AUTHORIZATION INFORMATION

(75) Inventors: Erwin Hom, Foster City, CA (US); Clay Maeckel, San Jose, CA (US)

(73) Assignee: Apple Inc., Cupertino, CA (US)

( * ) Notice: Subject to any disclaimer, the term of this patent is extended or adjusted under 35 U.S.C. 154(b) by 326 days.

(21) Appl. No.: 11/048,834

(22) Filed: Feb. 1, 2005

(65) Prior Publication Data

US 2006/0173810 A1     Aug. 3, 2006

(51) Int. Cl.
    *G06F 17/30* (2006.01)
(52) U.S. Cl. .............................................. 707/9; 726/2
(58) Field of Classification Search ...................... 707/9, 707/3, 10; 709/217; 726/2
    See application file for complete search history.

(56) References Cited

U.S. PATENT DOCUMENTS

| | | | | |
|---|---|---|---|---|
| 6,292,904 | B1 * | 9/2001 | Broomhall et al. ............. | 714/1 |
| 6,980,989 | B2 * | 12/2005 | Silverman et al. ............. | 707/9 |
| 7,051,036 | B2 * | 5/2006 | Rosnow et al. ............. | 707/102 |
| 7,120,785 | B1 * | 10/2006 | Bowers et al. ................. | 713/1 |
| 2002/0055921 | A1 * | 5/2002 | Yoshimura et al. ............. | 707/9 |
| 2003/0079029 | A1 * | 4/2003 | Garimella et al. ........... | 709/229 |

OTHER PUBLICATIONS

William Stallings, "Operating Systems, Chapter 11: File Management," Second Edition, Prentice Hall, pp. 450-486.
John Viescas, "Running Microsoft Access 200, Part I: Understanding Microsoft Access," Microsoft press, pp. 3-76.

* cited by examiner

*Primary Examiner*—Shahid A Alam
*Assistant Examiner*—Alexandria Y Bromell
(74) *Attorney, Agent, or Firm*—Beyer Law Group LLP

(57) ABSTRACT

Techniques for using both database internal and database external authorization information to control access to a database are disclosed. Corporate accounts which are generally used in many corporate environments (e.g., operating system accounts) can be defined as "external" database accounts with database external authorization information that define database external access privileges for a database. The database external access-privileges are used in conjunction with a set of complementary database "internal" access privileges defined for database internal accounts. An integrated access-privilege set is generated and used as a single source to authorize access to a database regardless of whether database internal or external accounts are used to access the database. As a result, databases can be integrated with various non-database entities (e.g., corporate computing systems).

8 Claims, 8 Drawing Sheets

Edit Account

Specify account settings so a user (or group of users) can log in and access this database.

Account is authenticated via: External Server

Group Name: Software

Authentication for this account will be handled using the method you designate in FileMaker Server.

Account Status: ● Active  ○ Inactive

Privilege Set: [Read-Only Access]  Edit...

Description:

Cancel   OK

CONTROLLING ACCESS TO A DATABASE USING DATABASE INTERNAL AND EXTERNAL AUTHORIZATION INFORMATION

BACKGROUND OF THE INVENTION

The present invention relates to databases and, more particularly, to controlling access to a database.

Databases are used to store data in a manner that facilitates subsequent use of the data. Typically, a database includes several tables containing one or more records. A record in a table stored in the database can hold information about a subject or item in its various fields.

To allow a user to more easily access and manage data stored in databases, database programs have been developed. Database programs, among other things, often provide a user interface, which allows the user to conveniently interact with the database program in order to perform various operations on the data stored in the database. The interface provided by the database program is typically a graphical user interface which allows the user to conveniently interact with the database program and, in turn, with the database. The user may interact with the graphical user interface to, for example, view the data in various ways. The visual representations provided to the user can include, for example, a browse mode. The browse mode allows records to be viewed, changed, sorted, deleted, or added.

As noted above, a database program allows users to conveniently access data stored in a local database. It should be noted that a database program (or product) could also be provided as database server (or host), which allows a client (or a guest) to access data in a database, which is stored in a remote location with respect to the client. Generally, a first database program can, for example, be connected to a second database program over a computer network. In any case, one database program can act as a "client" (or guest) and establish a connection to the other database program which acts as "server" (or host) to a database. The client database program can, in turn, provide the end-user (e.g., a human, or application program) with access to data, which is stored remotely.

Conventional database server programs (or products), however, can be configured only to grant access to a database based on a set of database accounts, which are typically defined by a database administrator, or alternatively grant access based on a set of operating system accounts which are typically defined by a system administrator. These operating system accounts are typically a set of general purpose accounts associated with different category of access privilege (e.g., "admin," "manager," "data-entry-only").

These different categories of access privileges are typically assigned to several different users. For example, several different individuals may be assigned the access level "manager." This approach, however, does not allow a particular user to be identified when an external account is used, and thus may not adequately support a secure environment and/or allow monitoring (or logging) activities initiated using external accounts. In addition, access privileges cannot be easily modified (or updated) when general categories of access privileges are used (because access privilege is not defined per individual users). For example, if a particular manager leaves, the "manager" access level should be changed to security reasons. As a result, several other managers may have to be assigned a new access-level.

Moreover, conventional techniques do not allow configuring a server database product (or program) such that both database and operating system accounts can be used together to control access to a database. In other words, conventional database server products control access to a database either entirely based on non-database accounts (e.g. operating system accounts), or entirely based on a set of identifiers (e.g., access keys), which are typically maintained and administered separately from the non-database accounts.

As database products are more commonly used to access databases in corporate environments, the need for integration of databases with corporate computing systems becomes more prevalent. Accordingly, improved techniques for controlling access to databases are needed.

SUMMARY OF THE INVENTION

Broadly speaking, the invention pertains to techniques for controlling access to a database.

In accordance with one aspect of the invention, sets of database "internal" and "external" (or non-database) access-privileges are defined for a database. An "external" database component can, for example, be any component that resides outside a database system, program, or product that is used as interface to access a database. It will be appreciated that corporate accounts which are generally used in many corporate environments (e.g., operating system accounts) can be defined as database "external" accounts in accordance with one embodiment of the invention. In general, the database external access-privileges are used in conjunction with a set of complementary database "internal" access privileges defined for database internal accounts. In addition, sets of database "internal" and "external" access-privileges are can be combined to generate an integrated access-privilege set which can be used as a single source to authorize access to a database regardless of whether database internal or external accounts are used to access the database. As such, the invention can be used to seamlessly integrate databases with various non-database entities (e.g., corporate computing systems). It should also be noted that non-database accounts may be authenticated externally, but access can be authorized using a database component (e.g., a server-side database component). Hence, databases can be integrated with various non-database entities, while authentication of non-database accounts is still performed by database external entities that are generally more preferred to authenticate their own accounts.

As will be described below, the invention can be implemented to control access with respect to both database internal and external accounts, which can be used to seek access to the database. Moreover, access to the database can be controlled using the same authentication information (e.g., username and password of an operating system account) regardless of whether the database is internally or externally accessed. This can be achieved by defining and using database "internal" and "external" access-privileges in a manner that allows combining them together and using them as an integrated access-privilege set arranged in accordance with assigned priority of authorized access. As a result, database internal and external access privileges may be conveniently defined and maintained in a central location, by a single entity that does not have to be a database administrator (e.g., a system or server administrator). Yet, a database administrator can still access the database using a database internal account regardless of which server or external ("non-database") authenticator has been chosen by the non-database administrator (e.g., a system or server administrator) to authenticate database users.

The invention can be implemented in numerous ways, including as a method, an apparatus, a computer readable medium, and a database product, program, or system. Several embodiments of the invention are discussed below.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which:

FIG. 7 and FIG. 8 respectively depict "Edit Account" panels used to edit (or create) database external and internal authorization information.

DETAILED DESCRIPTION OF THE INVENTION

Figure 1:
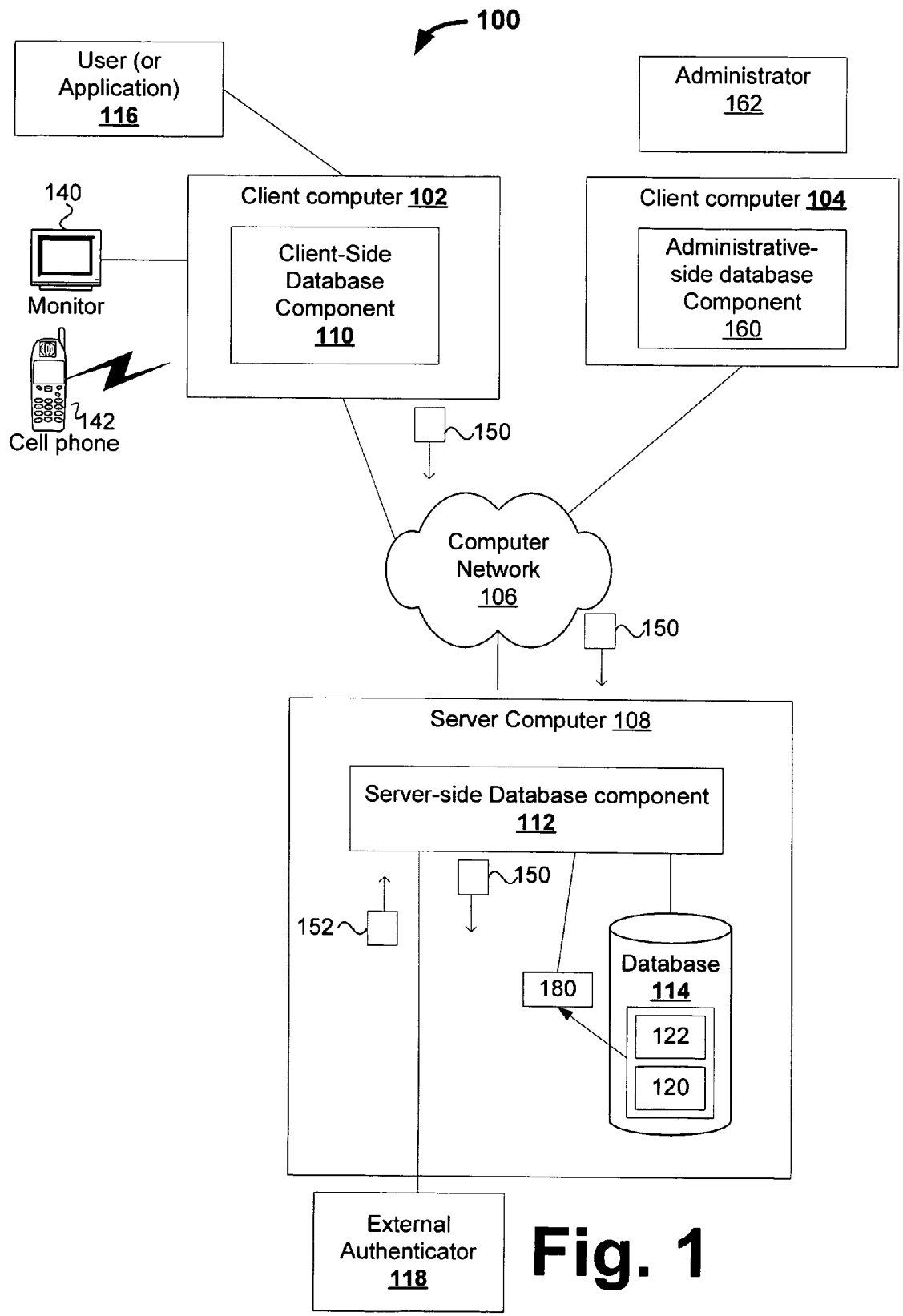
FIG. 1 depicts a computing environment in accordance with embodiment of the invention.

As noted in the background section, the need for integration of databases with corporate computing systems has become more prevalent. Accordingly, improved techniques for controlling access to a database are disclosed.

In accordance with one aspect of the invention, sets of database "internal" and "external" (or non-database) access-privileges are defined for a database. An "external" database component can, for example, be any component that resides outside a database system, program, or product that is used as interface to access a database. It will be appreciated that corporate accounts which are generally used in many corporate environments (e.g., operating system accounts) can be defined as "external" database accounts in accordance with one embodiment of the invention. In general, the database external access-privileges are used in conjunction with a set of complementary database "internal" access privileges defined for database internal accounts. In addition, sets of database "internal" and "external" access-privileges are can be combined to generate an integrated access-privilege set which can be used as a single source to authorize access to a database regardless of whether database internal or external accounts are used to access the database. As such, the invention can be used to seamlessly integrate databases with various non-database entities (e.g., corporate computing systems). It should also be noted that non-database accounts may be authenticated externally, but access can be authorized using a database component (e.g., a server-side database component). Hence, databases can be integrated with various non-database entities, while authentication of non-database accounts is still performed by database external entities that are generally more preferred to authenticate their own accounts.

As will be described below, the invention can be implemented to control access with respect to both database internal and external accounts, which can be used to seek access to the database. Moreover, access to the database can be controlled using the same authentication information (e.g., username and password of an operating system account) regardless of whether the database is internally or externally accessed. This can be achieved by defining and using database "internal" and "external" access-privileges in a manner that allows combining them together and using them as an integrated access-privilege set arranged in accordance with assigned priority of authorized access. As a result, database internal and external access privileges may be conveniently defined and maintained in a central location, by a single entity that does not have to be a database administrator (e.g., a system or server administrator). Yet, a database administrator can still access the database using an internal database account regardless of which server or external ("non-database") authenticator has been chosen by the non-database administrator (e.g., a system or server administrator) to authenticate database users.

Embodiments of these aspects of the invention are discussed below with reference to FIGS. 1-8. However, those skilled in the art will readily appreciate that the detailed description given herein with respect to these figures is for explanatory purposes as the invention extends beyond these limited embodiments.

FIG. 1 depicts a computing environment 100 in accordance with embodiment of the invention. As shown in FIG. 1, a plurality of client computers 102 and 104 can communicate with a server computer 108 via a network 106. As is known in the art, this communication may be established using a variety of existing wired or wireless communication protocols, hardware, and software components, which will not be discussed further. The client computer 102 includes a client-side database component 110 that can be used to initiate communication with a server-side database component 112 operating in the server computer 108. Typically, the client-side database component 110 is used in order to access data stored in a database 114. By way of example, a user (or application) 116 can initiate a request to access data using the client-side database component 110. This request may, for example, be initiated as a result of the user 116 requesting to list or open one or more database files stored in the database 114. The user 116 may, for example, use a monitor 110 or a wireless phone 142 to access the client computer 102.

In any case, a request to access database 114 can be initiated by the client-side database component 102, and transmitted via network 106 to the server-side database component 112. In response, the server-side database component 112 can initiate an authentication process when it receives the request to access database 114. Typically, this authentication process authenticates the user 116 of the client computer 102. By way of example, the user 116 may have used a [user-id and password] to login to the client computer 102. In such cases, the server-side database component 112 initially authenticates the user 116 by sending the [user-id and password] to an external authenticator 118 for authentication before access to the database 114 is granted. The external authenticator 118 can, for example, be an operating system account manager (e.g., Active Directory in Windows operating environment, Open Directory in MAC operating environment).

It should be noted that the actual [user-id and password] do not need to be known by the client-side database component 102. In general, authentication information 150 can be made available as a block of data that is forwarded to the external authenticator 118 for authentication. The external authenticator 118 can, for example, decode and/or decrypt the block of data in order to authenticate the user 116.

In any case, if the user 116 is authenticated, the external authenticator 118 notifies the server-side database component 112 that the user 116 has been authenticated. In addition, the external authenticator 118 can send authorization information 152, for example, as one or more privilege-identifiers, which are associated with the authentication-information 150 (e.g., user-id and password) of the authenticated user. By way of example, a privilege-identifier may be a group-name that is also used in operating system accounts of corporate computing environments. As such, a privilege-identifier may associate a user with a group that has certain privileges with respect to data stored in a database (e.g. a group name used in Active Directory in Windows operating environment).

After the authentication process, the server-side database component 112 can initiate an authorization process, which determines the privileges, which have been assigned to the user 116 with respect to database 112 (i.e., access-level privileges). As will be discussed below, sets of database internal information 120 (e.g., database account information) and database external information 122 (e.g., database external authentication information) can be defined for the database 114. In one embodiment described below, the database internal information 120 is defined as a set of database internal accounts that include both authentication information (e.g., name and password) with associated authorization information (e.g., an access-privilege set), while the database external 122 information includes external authorization information (e.g., group-names with associated access-privileges). In other words, the database external information 122 does not need to include external authentication information. As such, there is no need to store external authentication information in a database, and external authentication may be independently performed by a database external entity (e.g., an external authenticator). Moreover, the set of database internal and external information can combined to generate an integrated access-privilege set 180 which is used to control access to the database.

Hence, the server-side database component 112 can determine access-level privileges of user 116 even though the user may have been externally authenticated by the external authenticator 118. More particularly, the server-side database component 112 can be configured to use the authorization information 152 sent by the external authenticator 118 and compare it with the generated integrated access-privilege set 160 in order to authorize the user 116 as a database internal or external account. Moreover, the server-side database component 112 can use the authentication information 152 in a manner that allows integration of external accounts (e.g. corporate accounts) used by various environments with database internal accounts. As will be discussed below, this integration allows authorized use of both database internal and external accounts, which attempt to access the database.

It should also be noted that that an administrator-side database component (e.g., an administrative tool) 160 may also be provided to allow an administrator 162 to administrate the database 114 via server-side database component 112. Both users and administrators can be provided with authorized access in essentially the same manner. As such, authorization of user will be further discussed.

Figure 2:
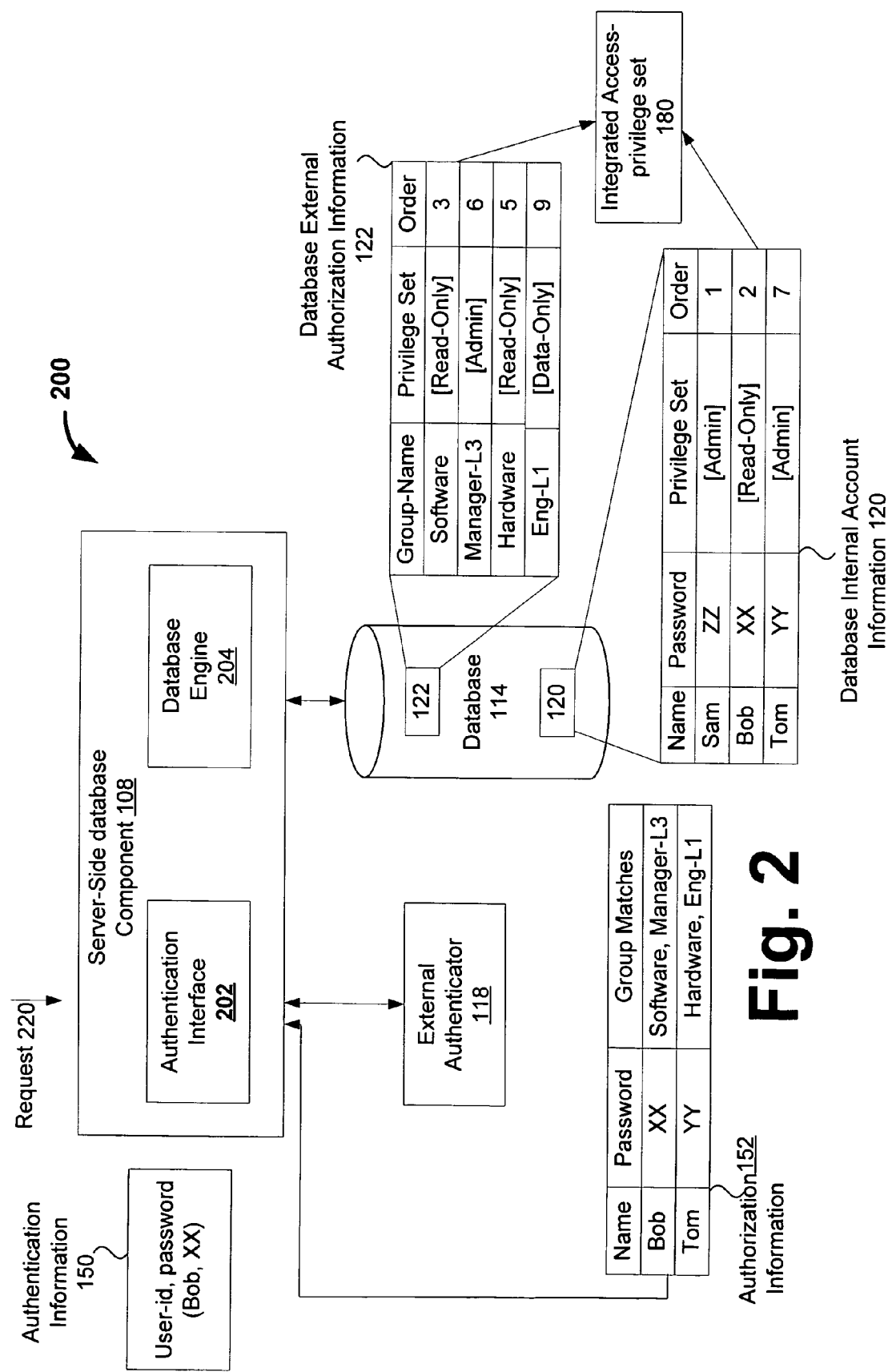
FIG. 2 depicts a server-side database component 108 in accordance with one embodiment of the invention.

To further elaborate, FIG. 2 depicts in greater detail the server-side database component 108 (shown in FIG. 1) in accordance with one embodiment of the invention. As shown in FIG. 2, the server-side database component 108 includes an authentication interface 202 which can communicate with the external authenticator 118 (also shown in FIG. 1). In addition, a database engine 204 is connected to the authentication interface 202 and database 114.

When a request 220 to access the database 114 is received by the server-side database component 108, authentication information 150 is forwarded, by the authentication interface 202, to the external authenticator 118, which initiates an authentication process. If the authentication process successfully authenticates the user associated with the authentication information 150, the external authenticator 118 determines authorization information 152 associated with the user and forwards it to the authentication interface 202. By way of example, authentication information 150 may be in the form of a name and a password set (e.g., Bob and xx) which is forwarded by the authentication interface 202 to the external authenticator 118. Again, it should be noted that the authentication information 150 (e.g., Bob, xx) may be explicitly known, or may be forwarded as a block of data without the server-side database component 108 (or authentication interface 202) having explicit knowledge of its content.

In any case, upon receipt of the authentication information 150, the external authenticator 118 can initiate an authentication process, which if successful, may result in transmission of authorization information 152 to the authentication interface 202. Typically, the authorization information 152 includes database external privilege-identifiers associated with access privileges of the authenticated user. As such, authorization information 152 can provide access-level privileges that have been defined for the authenticated user for an operating system.

As will be appreciated, these access privileges for a database may also be defined in a similar manner as privileges defined in corporate accounts (e.g. operating system accounts) in accordance with one embodiment of the invention. By way of example, group-names may be defined and associated with various user names and passwords in a set of database external authorization information 122, which is defined for the database 114 and can be stored in the database 114. As such, after authentication of a user's authentication information 150 (e.g., Bob and xx), group matches (e.g., Software, Manager Level-3 group), which have been defined in the operating system accounts for the user, may be identified by the external authenticator 118, and forwarded back to the authentication interface 202. As will be appreciated, these group names may also be defined for the database 114 and provided in the set of database external authorization information 122, which defines access privileges, assigned to each group-name. By way of example, group-names: "Software group" and "Manager Level-3" may respectively be associated with "read-only" and "Admin" access privileges.

As a result, a name and a password pair (e.g., Bob and xx) used to sign into a corporate computing system (e.g., operating system account) can effectively also be assigned privileges with respect to accessing a database. Furthermore, the same name and password pair may be assigned access privileges and be stored in the database internal account 120. As shown in FIG. 2, database internal authorization information may be defined, for example, to associate a name and a password pair (Bob, xx) with "read-only" access privilege. Moreover, both internal and external authorization information stored respectively in the database internal accounts 120 and database external authorization information 122 can be used together to determine access-privileges of a user with respect to the database 114.

As shown in FIG. 2, an order field 230 can be provided for both the database internal accounts 120 and database external authorization information 122. The order field may be used to determine whether a user account should be considered as an internal or external database account. By way of example, when the authorization information 152 includes a name, password, and one or more associated group-names (e.g., Bob, xx, Software, and Manager Level-3 group names), the internal and external authorization information 120 and 122 of the database 114 can be searched in accordance with the particular order indicated by the order field. It should also be noted that the order field could be used to effectively generate an integrated access-privilege set 180, which, among other things, can be displayed, for a user to allow convenient creating and maintenance of an integrated access-privilege set.

In this example, authorization information 152 (Bob, xx), which is also associated with group names: Software and Manager Level-3, would be matched as an internal database account with "read-only" privilege (Order 2). However, authorization information (Tom, yy), associated with Hardware and Engineering Level-1 groups, may be matched to an external database account with access privilege of: "read-only" (Order 5).

Although not depicted in FIG. 2, it should be noted that a plurality of different external authenticator interfaces associated with various external authenticators might be used to integrate a plurality of different operating systems and platforms with a database. Furthermore, much more complex algorithms may be used to determine priority. For example, each of the external accounts may additionally be assigned a weight which is added to individual priority assigned to each account (e.g., an order) in order to determine which access levels should be used.

Figure 3:
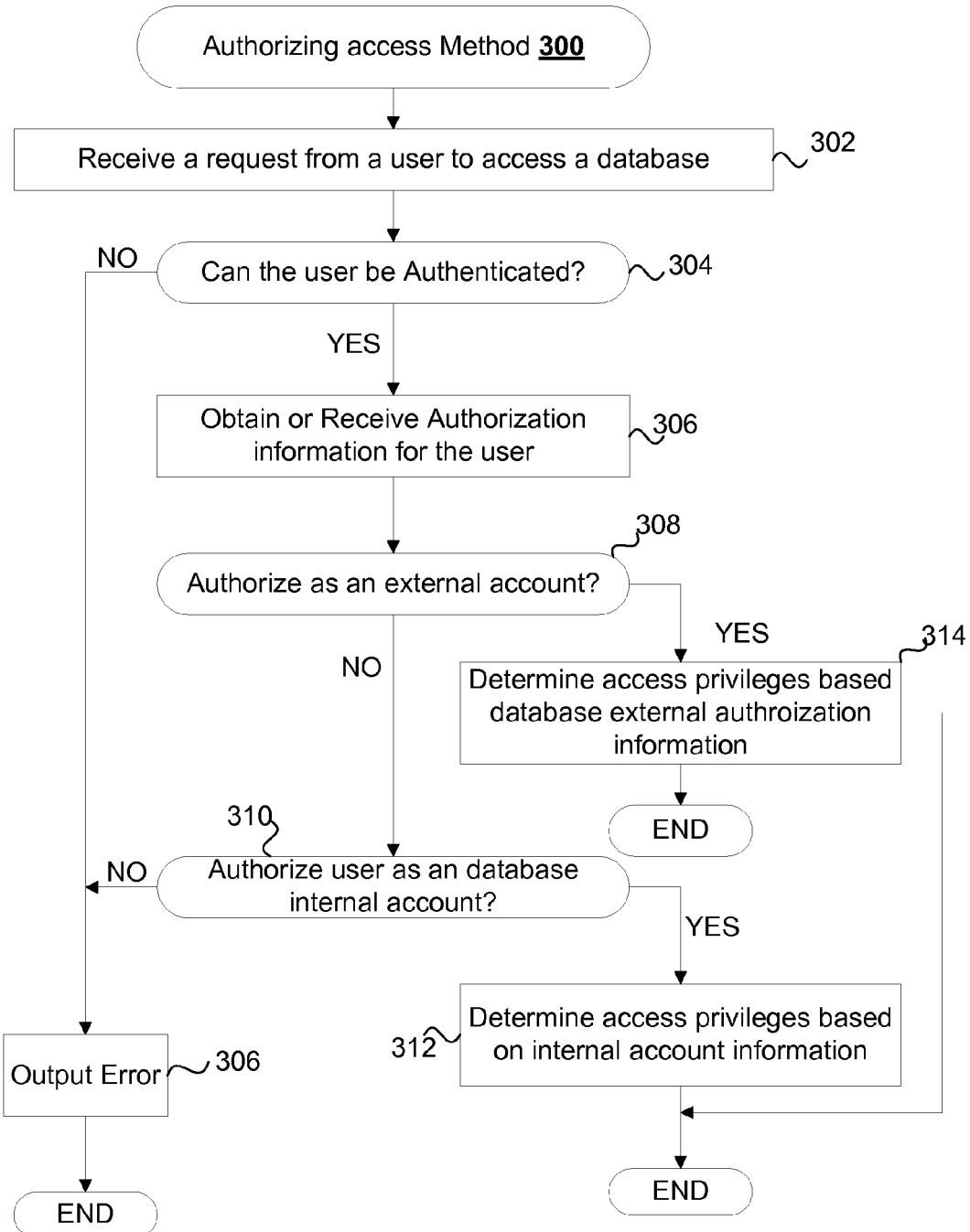
FIG. 3 depicts an authorizing access method for authorizing access to a database in accordance with one embodiment of the invention.

FIG. 3. depicts an authorizing access method 300 for authorizing access to a database in accordance with one embodiment of the invention. Initially, a request to access the database is received (302). This request is typically received from a user on a local (or client) computer who is attempting to access a remote database via a server. When the request to access the database is received (302), it is determined (304) whether the user can be authenticated (304). If it is determined (304) that the user cannot be authenticated, an error is output (306) and the authorizing access method 300 ends. However, if it is determined (304) that the user can be authenticated, integrated authorization information is obtained or received (306). Again, the authorization is typically associated with a user on a local computer who is attempting to access data stored on a server in a remote location. Next, it is determined (308) whether authorization should be made as an external database account.

If it is determined (308) that authorization should not be made an external account, it is determined (310) whether authorization should be made as an internal account. If it is determined (310) that authorization should not be made as an internal account, error is output (306), and the authorizing access method 300 ends. However, if it is determined (310) that authorization should be made as an internal account, access privileges are determined based on authorization information stored as internal account information and the authorizing access method 300 ends. On the other hand, if it is determined (308) that authorization should be made as an external account, access privileges are determined (314) based on database external authorization information. The authorization access method 300 ends following operations (314) or (312). Determination (314) will be described in greater detail below. The determination of whether authorization should be made as an external account (308) or an internal account (312) will also be described below.

Figure 4:
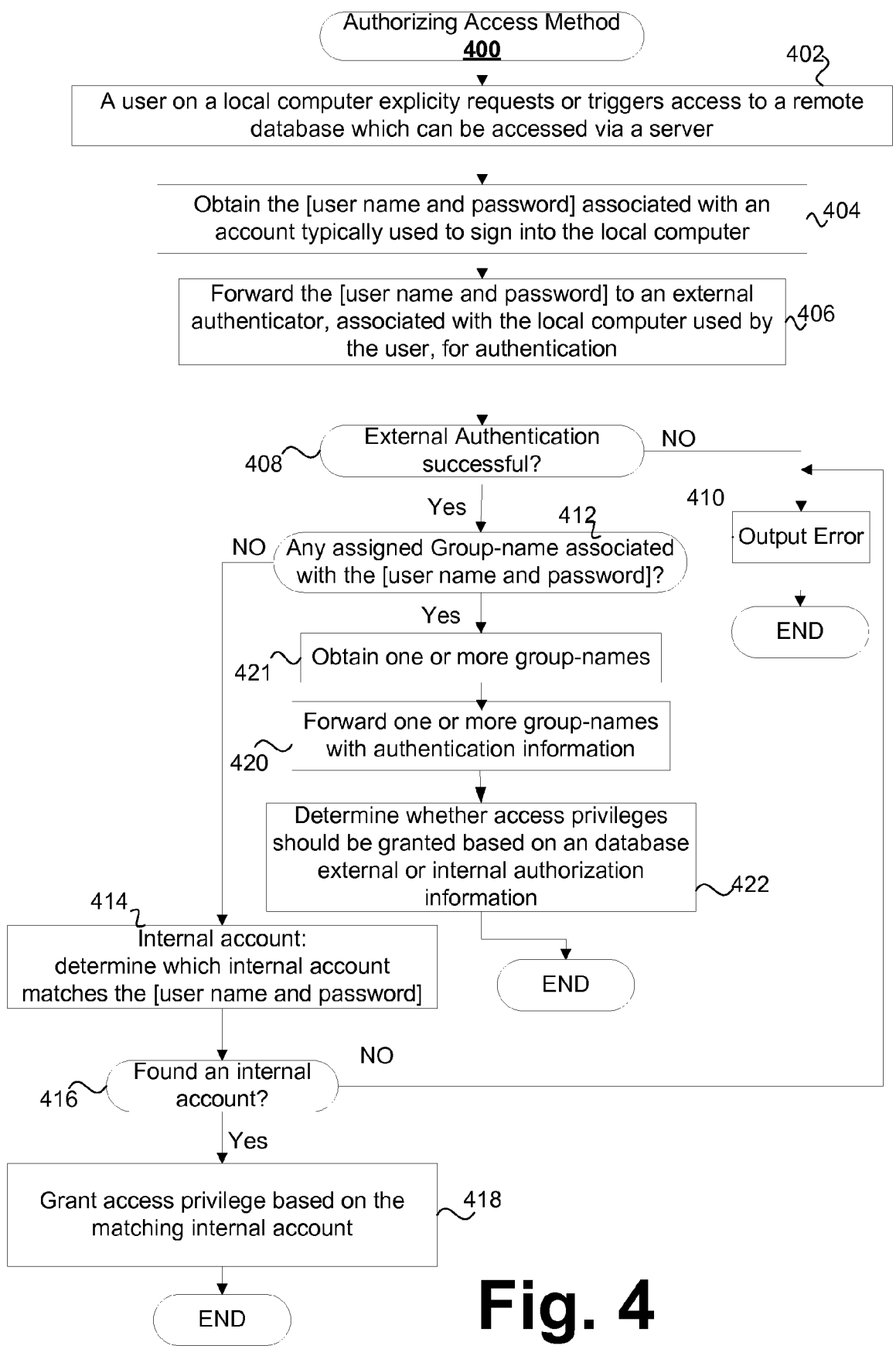
FIG. 4 depicts an authorizing access method for authorizing access to a database in accordance with another embodiment of the invention.

FIG. 4 depicts, in greater detail, an authorizing access method 400 for authorizing access to a database in accordance with another embodiment of the invention. Initially, a user on a local computer explicitly requests or triggers access (402) to a remote database. The remote database is typically accessed via a server. Next, authorization information associated with the users' account is obtained (404). By way of example, the authorization information can be a user name and a password. Typically, the same user-name (or user-id) and password are used by the user to sign into a local computer. As such, the user name and password may, for example, correspond to an operating system account. In any case, when the authorization information is obtained (404), the authorization information, (e.g., user name and password) are forwarded (406) to an external authenticator. Typically, the external authenticator is associated with the operating system or platform of the local computer that the user has signed into.

Next, it is determined (408) whether the external authentication was successful. If it is determined (408) that the external authentication was not successful, error is output (410), and the authorizing access method 400 ends. However, if it is determined (408) that the external authentication was successful, it is determined (412) whether any group names have been assigned to the authentication information, (e.g., user name and password). If it is determined (412) that a group name has not been associated or assigned to the authentication information, a database internal account is used (414) in order to authorize access to the database. More particularly, a determination is made (414) as to which internal account matches the authentication information, (e.g., user name and password). As such, it is determined (416) whether an internal account matches the authentication information. Accordingly, if it is determined (416) that an internal database account matches the authentication information, access privileges are granted (418) based on the matching authorization information in the database internal account, and the authorizing access method 400 ends. However, if it is determined (416) that a database internal account which matches the authorization information was not found, an error is output (410), and the authorizing access method 400 ends.

On the other hand, if it is determined (412) that there is at least one group name associated with the authentication information, one or more group names associated with the authentication information is obtained (420), and forwarded (421). Thereafter, it is determined whether access privilege should be granted based on database external or internal authorization information. Determination (422) will be described in greater detail with respect to FIG. 5 in accordance with one embodiment of the invention. The authorization access method 400 ends following determination (422) of whether access privileges should be granted from an external account or an internal account. In other words, upon successful validation of authorization information, access may be granted based on either internal or external account information.

Figure 5:
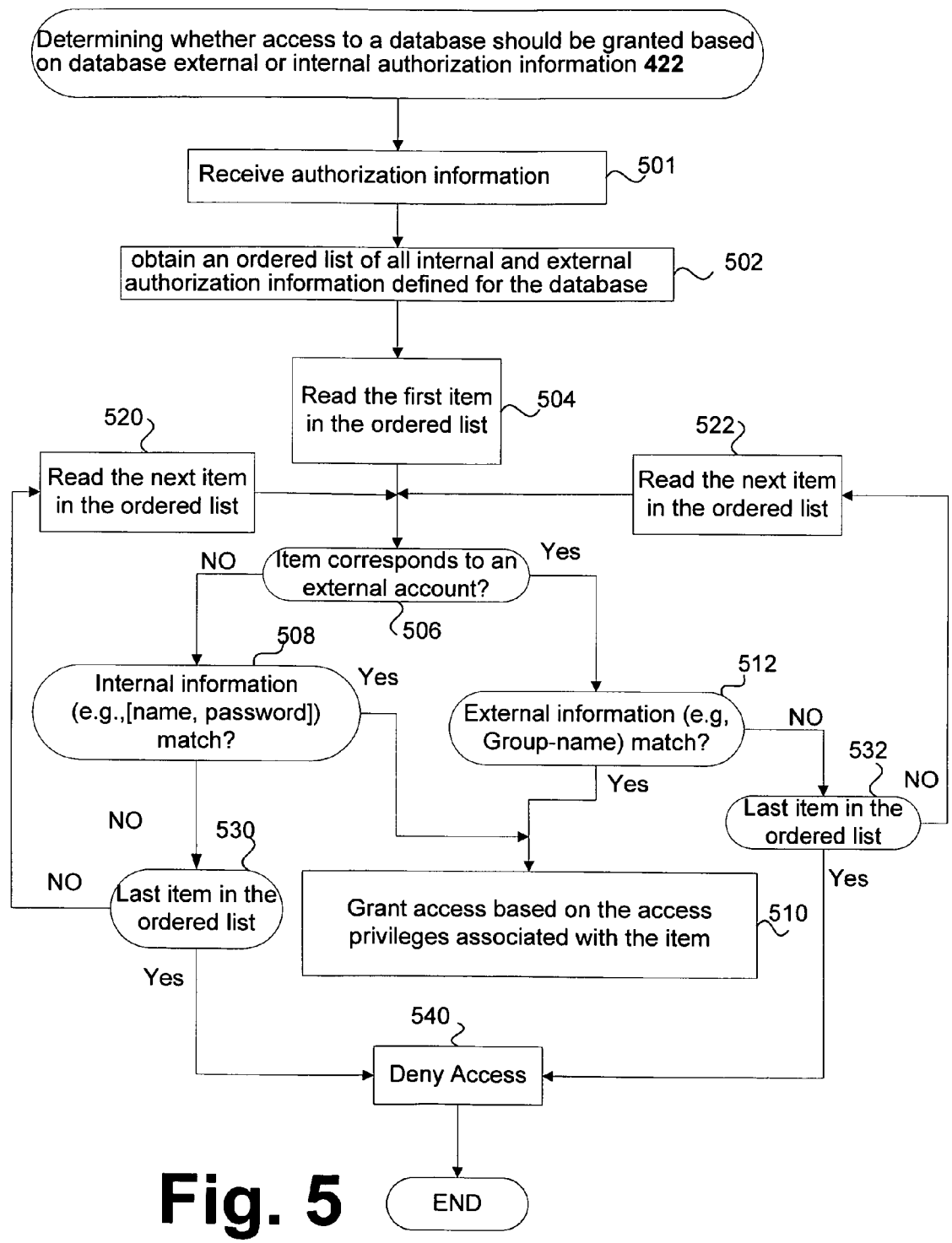
FIG. 5 depicts a method for determining whether access to a database should be granted based on database external or internal authorization information in accordance with one embodiment of the invention.

FIG. 5 depicts a method 422 for determining whether access to a database should be granted based on database external or internal authorization information in accordance with one embodiment of the invention. Initially, authorization information is received (501). Typically, the authorization information is associated with a user seeking access to a database, and may include both internal authorization information (e.g., [name, password]), and external authorization information (e.g., one or more group-names). By way of example, authorization information may include: a user name: Bob, password: XX, and matching group-names: software and manager level-3 (also shown in FIG. 2).

In addition, an ordered list of all internal and external authorization information, which has been defined for the database, is initially obtained (502). As noted above, internal and external authorization information may, for example, be stored for each database that is made available to both local and remote users. Each of the internal and external authorization information may, for example, be provided in a table that includes an order or priority assigned (e.g., internal account information 120 and external authorization information 122 shown in FIG. 2). In any case, an ordered list of all internal and external authorization information (e.g., an integrated access privilege set) is obtained (502). As will be described below, the method 422 operates to compare the authentication information received (501) with this ordered list (502).

More particularly, the first item in the ordered list (e.g., Sam, ZZ, order 1) is read (504). Generally, it is determined (506) whether an item, which has been read from the ordered list, is associated with an external account. The determination (506) may, for example, be made by providing an external or internal field or flag for each item in the ordered list. If it is determined (506) that the item is not associated with an external account (i.e., the item is associated with an internal account), it is determined (508) whether the item matches the portion of the authorization information that corresponds to an internal account. By way of example, it can be determined whether the [name, password] portion of the authorization information matches the [name, password] portion of the item obtained form the ordered list that corresponds to a database internal account.

If it is determined (506) that the portion of the authorization information the corresponds to a database internal account matches the authorization information, access can be granted (510) based on the privileges associated with the matching item, and the method 422 ends. However, if it is determined (506) that the item, which has been read (504) from the ordered list, is associated with a database external account, it is determined (512) whether the portion of the authorization information, corresponding to a database external account (e.g., one or more group-names), matches the authorization information received (501). As will be appreciated, the authorization information corresponding to an external account may also be arranged in order. By way of example, group-names may be arranged in accordance with an access-priority, and be considered in the order of access-priority. In any case, if it determined (512) that the portion of the authorization information, corresponding to database external accounts, matches the read item from the ordered list, access is granted (510) based on privileges defined in the item. On the other hand, if it is determined (508) that the internal authorization information does not match, or if it is determined (512) that the external authorization information does not match, the next item in the ordered list can be read (520, 522). If it is determined (530, 532) that last item in the ordered list has been read, but no match has been found, access is denied (540), and the authorization method 422 ends.

Figure 6:
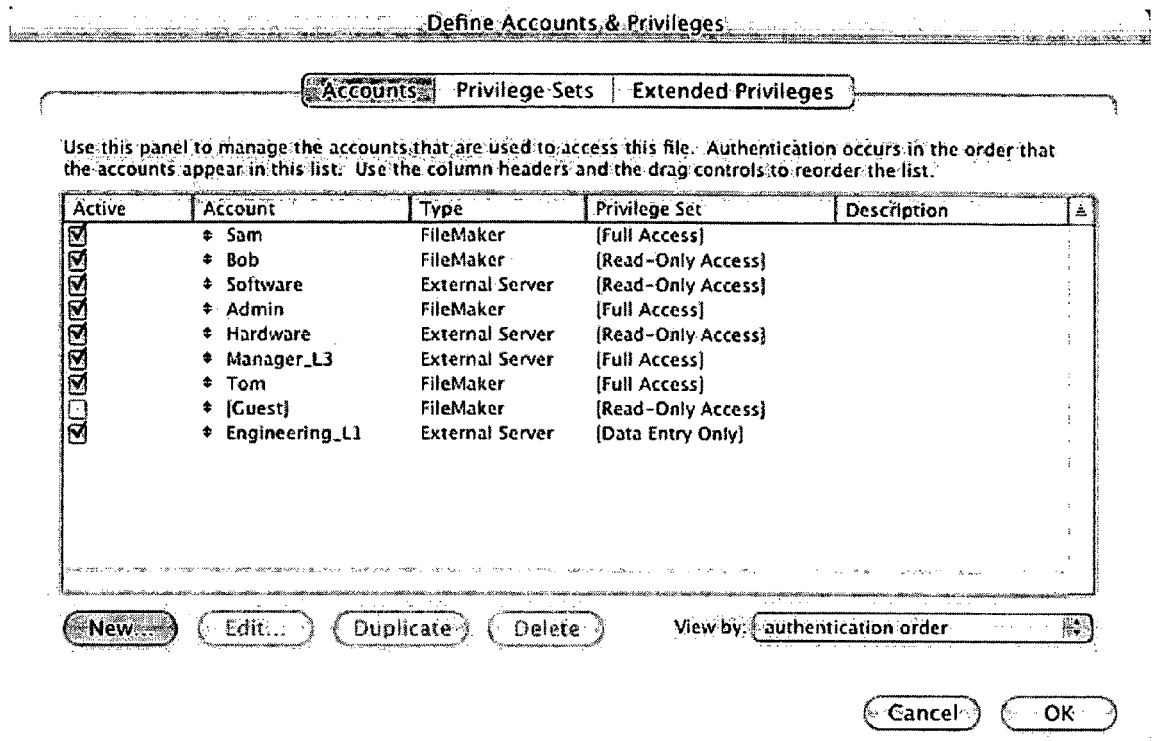
FIG. 6 depicts a "Define Accounts and Privileges" panel in accordance with one embodiment of the invention.
Figure 8:
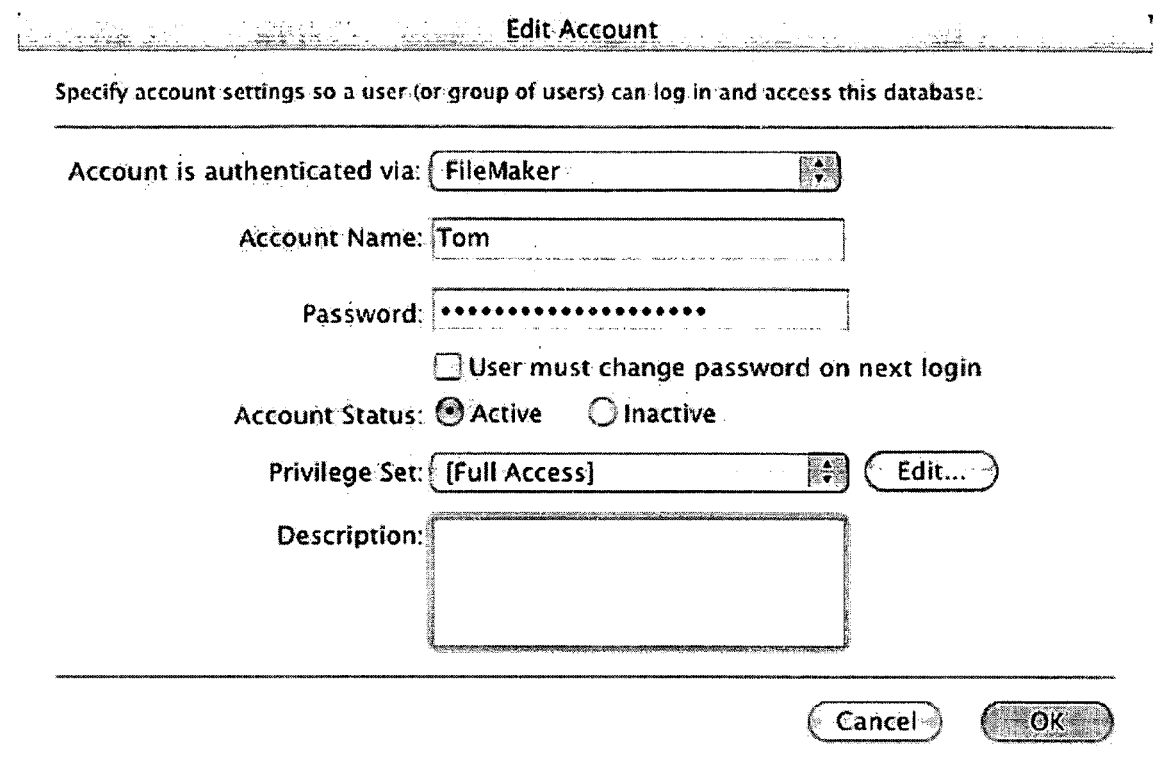

FIGS. 6, 7 and 8 depict representative screens, which are generated by a graphical user interface provided for accessing a server-side database product (or program) in accordance with one aspect of the invention. More particularly, the graphical user interface can be used to manage internal and external authorization information respectively for database internal and external accounts.

FIG. 6 depicts a "Define Accounts and Privileges" panel in accordance with one embodiment of the invention. As shown in FIG. 6, several database internal accounts (labeled as File-Maker) and database external accounts (labeled as External Server) are displayed. As will be appreciated, both database internal and external accounts may be managed using the panel depicted in FIG. 6. For example, authentication and/or authorization can occur based on the order, which appears in the panel, and so on.

FIG. 7 and FIG. 8 respectively depict "Edit Account" panels used to edit (or create) database external and internal authorization information. Referring to FIG. 7, an "Edit Account" panel may be used to define a group name and a privilege set when an external server is chosen for authentication. As depicted in FIG. 8, the "Edit Account" panel may also be used to define a database internal account (i.e., File-Maker), which can be authenticated internally by the database server. In any case, various privileges (e.g., "Full Access, "Data Entry Only") may be defined for different database internal or external accounts.

The advantages of the invention are numerous. Different embodiments or implementations may yield one or more of the following advantages. One advantage is that the invention that database and non-database access-privileges can be integrated and used to control access to a database. Another advantage of the invention is that is possible to externally authenticate non-database accounts by database external authenticator, while access to the database is authorized by a database component. Yet another advantage of the invention is that it is possible to define database internal accounts that can be used to access the database regardless of which database external server or authenticator is used. Still another advantage of the invention is that it is possible to use operating system account used in many existing corporate environments as external database accounts that are also authorized to access a database.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A computer-implemented method for controlling access to data stored in a database that stores at least a plurality of records, comprising:
receiving, from a remote location, authentication information associated with a request to access said database, wherein said authentication information is for at least one database external account defined for an external system external to said database;
determining, based on said authentication information, whether said request can be authenticated;
obtaining, from said database, integrated authorization data that has been stored on said database for said authentication information when said request can be authenticated, wherein said integrated authorization data includes one or more first authorization identifiers for said at least one database internal account and one or more second authorization identifiers for said at least one database external account, and wherein said first one or more authorization identifiers are different than said second one or more identifiers;
searching, based on said integrated authorization data, an integrated access-privilege set associated with said integrated authorization data, wherein said integrated access-privilege set has also been stored on said database and includes first authorization information for said at least one database internal account and second authorization information for said at least one database external account that has been defined based on said database external authorization information of said external account defined for said external system, wherein said first and second authorization information define different access-privileges for accessing said database;

determining, based on said searching of said integrated access-privilege set, whether access to said database should be granted as said database internal account which has been defined for said database, or whether access to said database should be granted based on database external authorization information of said external account defined for said external system, wherein said external authorization information effectively defines at least one database external account for said database corresponding to said external account defined for said external system;

authorizing access to said database based on access privilege information defined for a database internal account when said determines that access to said database should be granted as a database internal account defined for said database; and authorizing access to said database based on said external authorization information defined for said database external account when said determines that access to said database should be granted based on database external authorization information, thereby allowing said external account to be effectively used to access said database based on said external authorization information defined by said external system.

2. A method as recited in claim 1, wherein said integrated access-privilege set is an ordered list of access-privileges associated with both of said at least one database internal account and at least one database external account.

3. A method as recited in claim 2, determining whether access to said database should be granted as a database internal account or based on database external authorization information comprises:

determining said access-privilege information based on the order listed in said ordered list.

4. A method as recited in claim 1, further comprises:

authenticating said authentication information by an external database component which does not directly access said database; and receiving database external authorization information from said external database component.

5. A method as recited in claim 4, wherein said authentication information includes a username and a password, and wherein said external database component is an authenticator associated with an operating system.

6. A method as recited in claim 5, further comprising one or more of the following:

defining a set of database internal authorization information defined for said username and password; and storing said set of database internal authorization information in database internal accounts for said database.

7. A method as recited in claim 6, further comprising:

defining a set of database external authorization information for said username and password, based on one or more database external privilege-identifiers which has been defined for an operating system.

8. A method as recited in claim 7, wherein said database external privilege-identifiers are one or more group names defined for said operating system, and one or more access-privileges have been associated with each one of said one or more groups and stored as database external authentication information for said database.

* * * * *